United States Patent [19]

Kupfer

[11] Patent Number: 4,620,816
[45] Date of Patent: Nov. 4, 1986

[54] BIPEDAL GUIDANCE SYSTEM AND METHOD

[76] Inventor: Jeffrey H. Kupfer, 312 Washington St., Bldg. 2, Apt. 4, Wellesley, Mass. 02181

[21] Appl. No.: 671,548

[22] Filed: Nov. 15, 1984

[51] Int. Cl.$^4$ ............................................. E01F 11/00
[52] U.S. Cl. ........................................ 404/6; 404/9; 404/72; 52/174; 52/180; 434/112
[58] Field of Search ..................... 404/6.9, 15, 17, 42, 404/72; 116/205, DIG. 17, 63 R; 52/177, 181, 180, 174; 434/112, 113; 273/DIG. 27

[56] References Cited

U.S. PATENT DOCUMENTS

| | | | |
|---|---|---|---|
| 1,015,642 | 1/1912 | Seipp | 52/181 |
| 1,647,361 | 11/1927 | Furey | 404/15 |
| 1,698,594 | 1/1929 | Hoff | 404/15 |
| 2,438,764 | 3/1948 | Phillips | 404/9 |
| 2,574,090 | 11/1951 | Dofsen | 404/15 |
| 2,981,149 | 4/1961 | Stolarczyk et al. | 404/11 |
| 3,043,196 | 7/1962 | Palmquist et al. | 404/9 |
| 3,094,046 | 6/1963 | Zipelius | 404/16 |
| 3,216,335 | 11/1965 | Stolarcyk et al. | 404/11 |
| 3,274,888 | 9/1966 | Vanstrum et al. | 404/9 |
| 3,292,506 | 11/1966 | Kone | 404/11 |
| 3,363,339 | 1/1968 | Place | 434/113 |
| 4,069,787 | 1/1978 | Wyckoff | 116/63 R |
| 4,080,087 | 3/1978 | Phillips | 404/72 |
| 4,208,983 | 6/1980 | Buckley | 116/205 |
| 4,415,326 | 11/1983 | Nagata et al. | 434/113 |
| 4,490,069 | 12/1984 | Cushman et al. | 404/15 |

FOREIGN PATENT DOCUMENTS

| | | | |
|---|---|---|---|
| 562372 | 5/1875 | Switzerland | 404/14 |
| 1146527 | 3/1969 | United Kingdom | 434/112 |

OTHER PUBLICATIONS

Bruce F. Herms, "Guidestrips for Visually Handicapped Pedestrians", Dec. 1974, Metropolitan Ass'n of Urban Designer's & Environ, Planners, Inc., Third Nat'l Seminar of Planning, Design & Implementation of Bicycle and Pedestria, Facilities, San Diego, CA.

Bruce F. Herms, "The Role of the Disabled Pedestrian", Western District-Institute of Transportation Engineers, 29th Annual Meeting, San Diego, California, Jul. 18-21, 1976.

Bruce F. Herms, "The Preferred Wheelchair Route Concept a Systems Approach to Mobility", Instit., of Transportation Studies-Univ. of California, 29th Annual California Transportation & Public Works Conference, San Diego, CA, Apr. 20-22, 1977.

Primary Examiner—James A. Leppink
Assistant Examiner—Matthew Smith
Attorney, Agent, or Firm—Panitch Schwarze Jacobs & Nadel

[57] ABSTRACT

A guidance system is disclosed for permitting a person whose vision is impaired to continuously know his or her location with respect to the boundaries of an area having a walking surface and the spatial dimension of the area traversed. The guidance system comprises a plurality of tactual stimuli having predetermined physical characteristics distributed over substantially the entire walking surface. The physical characteristics of the tactual stimuli vary in a prdetermined detectable manner in relation to proximity to the boundaries. The variation in the physical characteristics is detectable by the touch of a person traversing the walking surface. Preferably, the tactual stimuli comprise three sets, each set of tactual stimuli being distributed over a separate portion of the walking surface. All of the tactual stimuli of each set has substantially the same physical characteristics. However, the physical characteristics of the stimuli of each of the three sets are different from one another to form a tactual gradient. A fourth set of tactual stimuli may also be included to indicate the location of an obstacle or landmark. A fifth set of tactual stimuli may also be included to indicate the location and nature of impending intersections. A fifth set of tactual stimuli may be included to indicate the location and nature of impending intersections.

7 Claims, 7 Drawing Figures

BIPEDAL GUIDANCE SYSTEM AND METHOD

BACKGROUND OF THE INVENTION

The present invention relates to a guidance system and method, and, more particularly, to such a system and method which permits a person whose vision is impaired to continuously know his or her location within an area.

Many different types of guidance systems and aids have been developed and employed for the purpose of guiding or assisting people whose vision is impaired. In the present application, the meaning of impaired vision includes not only a person suffering from a physical or other such disability which results in full or partial blindness, but also a temporary or area restricted vision impairment, such as may be encountered in a low-light environment, for example, in a movie theatre, smoke-filled corridor, or in a building during a power failure.

In the case of a low-light environment, devices such as independently powered emergency lighting and/or chemiluminescent lighting are sometimes employed to assist in properly orienting a person and/or guiding a person through the affected area. Some facilities employ physical structures such as handrails or embossed arrows or the like for this purpose. These devices have not been widely used or generally accepted so that there are many such low-light environment areas or potentially low-light environment areas (i.e., areas susceptible to power failure) which provide no such guidance aids.

Many different types of sensor aids have also been recently developed and produced for persons having a physical, visual impairment resulting in full or partial blindness. Many of the latest innovations are electromechanical in nature and are directed at improving existing aids, including such devices as laser canes. Other such innovations are merely new applications of existing technological devices such as sonic guides. Although many of the newer devices are technologically sound, because of their design, expense and complication, to date, they have not been widely accepted.

Recently, researchers have been examining the utility of tactual stimulation for guidance purposes. One avenue of such tactual stimulation involves the use of a change in the physical features of a floor surface as a cue to warn an individual of imminent danger, such as an obstacle, stairway or the like which is about to be encountered. For example, a generally smooth concrete sidewalk may be modified proximate the curb with a strip of rough surface material, such as by embedding pebbles or stones in the concrete surface, to clearly indicate the location of the curb. A person with impaired vision walking along the sidewalk who strays near the curb will immediately notice the difference in the texture beneath his or her feet and can change direction to avoid entering the street. Similarly, such a rough textured surface may be employed in connection with a pedestrian walkway crossing a street, particularly at an irregularly shaped intersection, again for the purpose of indicating the edge of the walkway to help keep a visually impaired person within the walkway.

While the use of such intermittently placed tactual stimuli for the purpose of delineating the location of obstacles or hazards or for signalling the position of lankmarks and objects has been shown to be effective for these purposes, the strategic placement of such stimuli constitute a very small percentage of the surface area contacted in routine travel by visually impaired persons. The area between these intermittent warning stimuli comprises the vase majority of surface area which has not been previously addressed.

The present invention comprises a bipedal guidance system for a person whose vision is impaired, which employs tactual stimulation over substantially the entire walking surface of a particular area, such as a room, hallway, pathway, intersection or the like. Thus, the entire floor or walking surface contains relevant information. The present invention represents a departure from the simple detection of intermittent gross changes in the walking surface to warn of impending obstacles or to signal landmarks and objects. Unlike the above-discussed prior art, there is no need to seek out a particular pathway, guidestrip or series of intermittent signals or stimuli. A person can proceed at his or her own natural stride and/or pace without having to compensate or adjust to conform to fixed guidestrips or separated cues. Further, unlike current technology, the present invention employs graded tactual stimuli to provide pedestrians with a means to develop spatial discriminations with respect to the area traversed.

The present invention also provides an independent and inconspicuous guidance system which permits a person whose vision is impaired to determine both the spatial dimension of the particular area and his or her location within the area. With the present invention, individuals feel with their feet to detect tactual stimuli over virtually the entire area of a walking surface which can guide them safely and efficiently along the walking surface. The physical changes in the tactual stimulation gradient approximates the functions of changes in visual stimuli for persons without visual impairments. By transposing these relevant stimulus features onto a textual medium, the present invention provides continuous and maximal stimulation. Thus, for example, the present invention provides for safe two-way traffic of persons whose vision is impaired, without interfering with the movement of other people, wheelchairs, etc. within the same area. With the proper training, the bipedal guidance system can supplement or reduce and eventually replace many spatial orientation and mobility functions currently accomplished with the use of a cane, guide dog and other such sensory aids. Since the tactual stimuli employed with the present invention are relatively unobtrusive, the guidance system can be used in areas normally traversed by people whose vision is not impaired and/or people with mobility impairments, without undue interference. The present invention, therefore, has the potential of providing genuine independence for a person whose vision is impaired.

SUMMARY OF THE INVENTION

Briefly stated, the present invention provides a guidance system and method which permits a person whose vision is impaired to continuously know his or her location with respect to the boundaries of an area having a walking surface. The guidance system comprises a plurality of tactual stimuli having predetermined physical characteristics, distributed over substantially the entire walking surface to form a tactual gradient, the physical characteristics of the tactual stimuli varying in a predetermined manner in relation to proximity to the boundaries of the area. The graded variation in the physical characteristics of the stimuli are detectible by the touch of a person traversing along the walking surface.

Preferably, the stimuli are varied in at least one of height, size, shape, slope, or spacing. In this manner, the person can ascertain his or her location with respect to the boundaries of the area and the spatial dimension of the area based solely upon the characteristics of the stimuli being walked on.

The present invention also provides a method for guiding a person whose vision is impaired along an area having boundaries and a walking surface comprising the steps of:

providing a first set of tactual stimuli continuously distributed along a first portion of the walking surface, extending from the boundaries inwardly for a first predetermined distance;

providing a second set of tactual stimuli generally continuously distributed along a second portion of the walking surface extending inwardly from the first portion of the walking surface for a second predetermined distance;

providing a third set of tactutal stimuli generally continuously distributed along a third portion of the walking surface extending inwardly from the second portion of the walking surface for a third predetermined distance, the physical characteristics of the stimuli of each of the three sets differing in a predetermined manner; and training a person whose vision is impaired to discriminate the tactual gradient formed by the sets of tactual stimuli and distinguish between the three sets of stimuli by touch as the person traverses the walking surface.

BRIEF DESCRIPTION OF THE DRAWINGS

The foregoing summary, as well as the following detailed description, will be better understood when read in conjunction with the appended drawings. For the purpose of illustrating the invention, there is shown in the drawings several embodiments which are presently preferred, it being understood, however, that this invention is not limited to the precise arrangements and instrumentalities shown. In the drawings.

DESCRIPTION OF PREFERRED EMBODIMENTS

Figure 1:
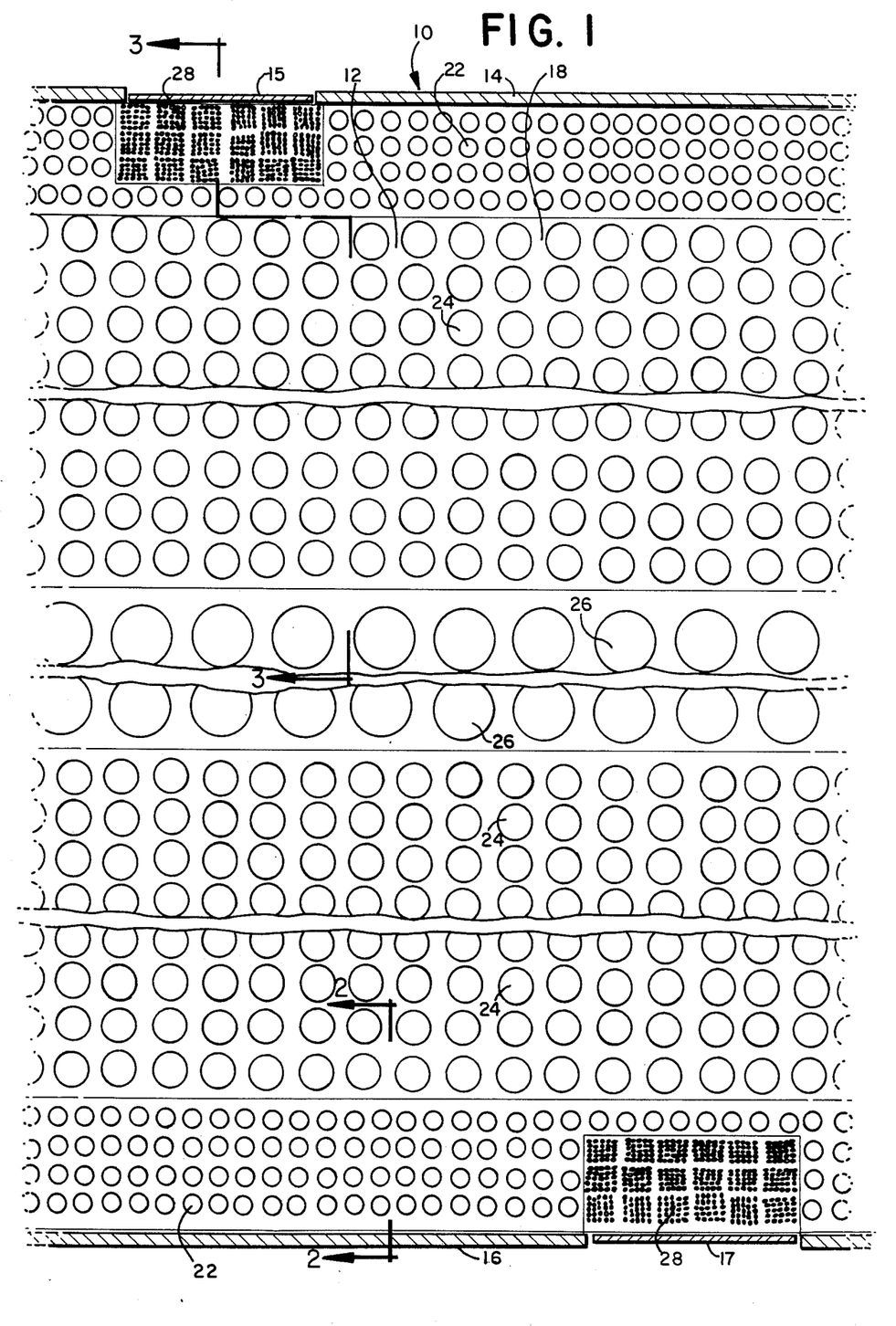
FIG. 1 is a schematic plan view, partially broken away (not to scale) of a portion of a walking surface showing a presently preferred bipedal guidance system in accordance with the present invention.

Referring to the drawings, wherein like numerals indicate like elements throughout, there is shown in FIG. 1 a plan view (not to scale) of a bipedal guidance system 10 in accordance with the present invention. In the present embodiment, the bipedal guidance system is located within a defined area such as an elongated hallway 12, only a portion of which is shown in FIG. 1. The area or hallway 12 includes boundaries, which in the present embodiment are comprised of a right sidewall 14 and a left sidewall 16. The sidewalls 14 and 16 include doors 15 and 17, respectively. The area or hallway 12 may include additional boundaries, such as endwalls or the like (not shown). In the present embodiment, the right and left sidewalls are shown as being generally parallel. However, it will be appreciated by those skilled in the art that the sidewalls 14 and 16, as well as any other such boundaries (not shown) may be oriented in a different manner. Likewise, although the sidewalls 14 and 16 are shown as being generally flat or straight, it will be appreciated by those skilled in the art that the sidewalls 14 and 16, as well as any other boundaries (not shown) could be of any shape. It should also be appreciated that the area may not be bounded by walls, but could be bounded by any other type of physical boundary, such as a curb or fence, or by a nonphysical boundary, such as a property line or crosswalk boundaries. The area may include irregularly shaped walkways, intersecting corridors, T-shaped intersecting corridors, etc.

Extending between the boundaries or sidewalls 14 and 16 is a walkway or walking surface shown generally as 18. The walking surface 18 in the present embodiment is approximately 2.5 meters wide and is supported by an underlying floor or subfloor 20. The floor or subfloor 20, in turn, is supported by suitable underlying support means, such as rafters or the like (not shown). It should be appreciated by those skilled in the art that the floor or subfloor 20 could be made of wood, steel, concrete or any other such material. Likewise, if the walking surface 18 is outside, such as a sidewalk or road, the floor or subfloor 20 could be comprised of concrete, asphalt, gravel, sand, grass or the like (not shown).

Figure 2:
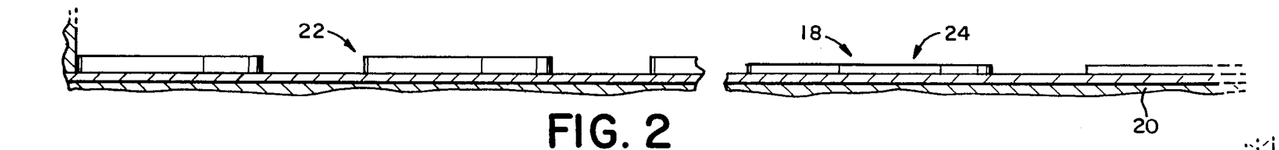
FIG. 2 is an enlarged sectional view (drawn to a scale of two times actual size) taken along line 2—2 of FIG. 1.
Figure 3:
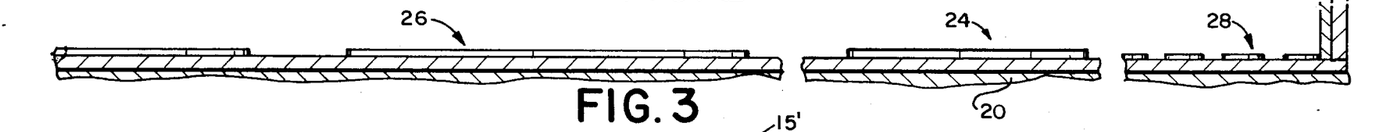
FIG. 3 is an enlarged sectional view (drawn to two times actual size) taken along line 3—3 of FIG. 1.

As best shown in FIGS. 1 through 3 the walking surface 18 is comprised of a plurality of individual tactual stimuli which are distributed over substantially the entire walking surface. In the present embodiment, the tactual stimuli comprise a gradient of individual stimuli embossed within the walking surface 18 and comprise studs which are generally cylindrically shaped and extend generally vertically upwardly. It should be clearly understood that any other type of tactual stimuli could alternatively be employed to form such a gradient. For example, different types, heights, or piles of carpet, spheres or semispheres, embedded pebbles or the like could be employed. Likewise, the stimuli could be of different shapes, for example, cross shaped, T-shaped, X-shaped, or the like.

The graded tactual stimuli or studs can be grouped into four different sets 22, 24, 26 and 28, the studs of each set having generally the same physical characteristics. The first or border set of tactual stimuli or studs 22 are generally continuously distributed along a first portion of the walking surface 18 extending generally inwardly from each of the sidewalls 14 and 16 for a first predetermined distance on each side. In the present embodiment, the first predetermined distance or the width of the border set 22 is approximately one-fifth of the width of the walking surface 18 or about 0.50 meter on each side.

In the present embodiment, all of the studs of the first or border set 22 are cylindrically shaped with a common diameter size and are all of generally the same height. As shown in FIG. 2 which is scaled to two times actual size, the studs of the border set 22 have a diameter of about 20 millimeters and a height of about 2 millimeters. Of course, the present invention is not limited to studs of the first or border set 22 or any of the other three sets 24, 26 and 28 which are of a particular shape, size or height.

As best shown in FIG. 1, the studs of the border set 22 are evenly distributed in generally parallel rows and columns over the first portion of the walking surface 18. The spacing between the individual studs of the border set 22 is generally uniform. Again, the distribution and spacing between the studs of the border set 22 or of any of the other sets 24, 26 and 28 may vary, if desired. However, preferably the distribution and spacing will remain uniform with respect to all of the studs of the border set 22.

The second or peripteral set of tactual stimuli or studs 24 are generally continuously distributed over a second portion of the walking surface extending inwardly from the border set 22 for a predetermined distance on both sides. In the present embodiment, the second predetermined distance is approximately one-fifth of the width of the walking surface 18 or about 0.50 meter on each side. Thus, the peripteral set 24 extends inwardly from about 0.50 meter from each of the sidewalls 14 and 16 to about 1.00 meter from each of the sidewalls.

All of the studs of the second or peripteral set have substantially the same physical characteristics. In the present embodiment, the studs of the peripteral set 24 are generally cylindrical and have a diameter of about 26 millimeters and an overall height of about 1 millimeter. The studs of the peripteral set 24 are generally uniformly spaced in a plurality of rows and columns over the second portion of the walking surface.

The third or central set of tactual stimuli or studs 26 are generally continuously distributed along a third portion of the walking surface 18 extending inwardly from the peripteral set 24 for a third predetermined distance to complete the gradient. In the embodiment shown, the third or central set of tactual stimuli 26 extend over generally the remaining one-fifth of the interior portion of the walking surface 18, or approximately 0.50 meter, and is surrounded by the peripteral set 24 on the both lateral sides.

All of the tactual stimuli of the central set 26 have substantially the same physical characteristics. In the present embodiment, the studs of the central set 26 are generally cylindrical with a diameter of approximately 42 millimeters and a total height of about 0.5 millimeter. As with the border set 22 and the peripteral set 24, the studs of the central set 26 are generally uniformly distributed in a plurality of generally parallel rows and columns with generally equal spacing between the individual studs. Of course, the studs of the central set 26 could be distributed in some other manner (not shown).

In the present embodiment the sets of tactual stimuli 22, 24 and 26 are formed on individual strips or tiles which are preformed or cut to conform to the desired length and width required for the particular walking surface 18. In the present embodiment, the tiles are approximately 0.50 meter wide. Alternatively, the tiles could be made a standard size or could be formed to comply with local building codes, if applicable.

Figures 4, 5:
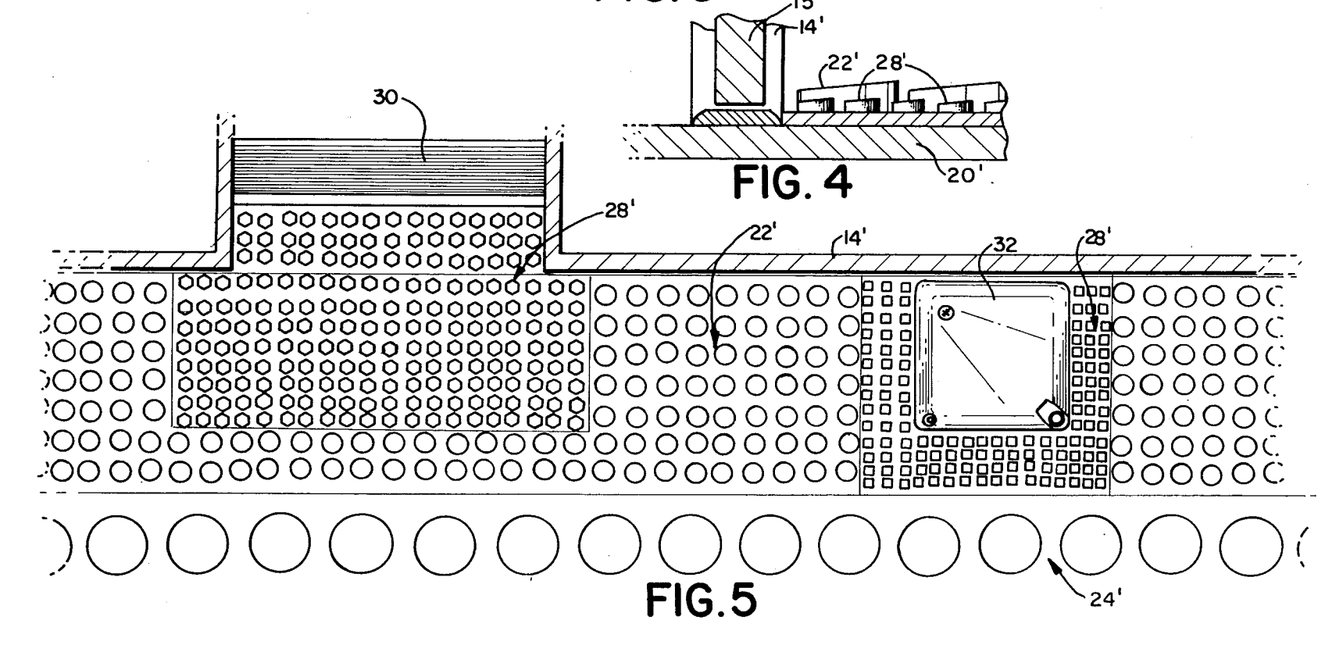
FIG. 4 is an enlarged fragmentary sectional view (not to scale) of an alternate embodiment of a bipedal guidance system showing a more specific feature.
FIG. 5 is a schematic plan view (not to scale) of an alternate embodiment of the guidance system of FIG. 1 showing stimuli for marking stairs and obstacles.

As is readily apparent from FIGS. 1 through 3 and from the foregoing description, the physical characteristics of the tactual stimuli of each of the three described sets 22, 24 and 26 form a tactual gradient, the stimuli of which vary in a predetermined, detectable manner in relation to proximity to the boundaries or sidewalls 14 and 16. In the embodiment shown in FIGS. 1 through 3, the variations between the sets of studs 22, 24 and 26 are in the diameter of the studs, 20, 26 and 42 millimeters, respectively, and in the height of the studs, 2, 1, and 0.5 millimeters, respectively. Alternatively, the tactual stimuli or studs of the three sets 22, 24 and 26 could vary in any other manner which is detectable by touch. It is also possible that stimuli could vary in a combination of differing manners. For example, FIG. 4 shows sets of studs which vary in stud height, stud diameter and in stud shape by having a slope imposed upon the stud upper surface. Likewise, FIG. 5 shows stud sets which vary in shape (circular, square and pentagon in cross section).

The reason for providing detectable variations in the physical characteristics of the studs of the three sets 22, 24 and 26 is so that the sets are distinguishable from each other by the touch of the undersurface of the feet or the tip of the cane of a person walking or otherwise traversing the walking surface 18. Thus, a person can form spatial discriminations about the physical dimensions of the area traversed and can determine his or her exact location with respect to the boundaries or sidewalls 14 and 16 based solely upon the physical characteristics of the stimuli being touched or walked upon. The tactual stimuli also serve to provide mobility alignment in that by maintaining the border set 22 on the right and the central set 26 on the left, a person can walk in a relatively straight line along the peripteral set 24 without having to stop periodically to make alignment adjustments.

In the present embodiment, the ratio of the width of the three stud sets 22, 24 and 26 is established to be 1/5:1/5:1/5:1/5:1/5 where the first and last 1/5 is the border set 22, the inner two 1/5 are the peripteral set 24 and the remaining 1/5 is the central set 26. If the same ratio of the widths of the three stud sets 22, 24 and 26 is maintained, a person whose vision is impaired can also determine the spatial dimensions of the walkway or area merely by knowing the width of the peripteral set 24 upon which he or she is walking. For example, if the person determines that the width of the peripteral set 24 is about four feet, the overall width of the area or corridor can quickly be calculated to be about twenty feet. It should be understood that the ratio of the widths of the various sets of tactual stimuli could vary and yet the concepts of the variations in the gradient could be preserved.

By arranging the sets of stimuli 22, 24 and 26 in the manner as described, maximum stimulation is provided proximate the sidewalls 14 and 16 since the border set 22 is the highest. By maintaining the central set 26 with the shortest studs with the largest surface area per stud, the stimulation is minimal. In addition, the arrangement for central set 26 is least disruptive of other persons, such as handicapped persons, wheelchair users or the like, who may be passing through the hallway 12.

In addition to the three primary stud sets 22, 24 and 26, the present embodiment employs a fourth or beacon set of tactual stimuli or studs 28. In the present embodiment, the beacon set 28 is also comprised of a plurality of generally cylindrical studs which are generally continuously distributed in a plurality of evenly spaced rows and columns along a fourth portion of the walking surface 18. The studs of the beacon set 28 are about 4 millimeters in diameter and approximately 0.5 millimeter in height. The purpose of the beacon set 28 is to indicate the location of an obstacle or the position of a landmark such as a stairway, intersection, or, in the present embodiment, doors 15 and 17. The beacon set 28 could alternatively be employed to indicate other such abnormalities in the walking surface, such as the presence of an up or down stairway, elevator, or the like (not shown).

The beacon set 28 may be employed universally to indicate the location of particular obstacles, landmarks or conditions. For example, cylindrical studs 28 which are circular in cross section as shown in FIGS. 1 and 3 may be adopted universally to indicate a door or doorway, studs 28' having similar height and spacing, but with a different shape such as a pentagon-shape as shown in FIG. 5 or a triangular shape (not shown), may be adopted universally to indicate a change in elevation such as a stairway 30 (FIG. 5) or escalator. Preferably a beacon set 28' which is being employed to indicate a stairway, exit, or some other important, possibly life-threatening, landmark or obstacle will be clearly discernible from the surrounding tactual stimuli, for example, by being a completely different shape such as triangular or pentagonal in cross section. Studs 28" having similar height and spacing, but with a square cross section may be universally used to indicate a specific landmark or object which is not life-threatening, such as a water cooler 32. Other such stud sets or combinations may be used to universally indicate other obstacles, landmarks or the like such as restrooms, etc.

With the guidance systems 10 of the present invention, a person whose vision is impaired is able to safely traverse an area, such as hallway area 12, without requiring any special apparatus or device, and without having to be concerned with walking into obstacles such as walls and the like. A person whose vision is impaired can walk continuously along the peripteral set 24 and will know whether he or she has strayed to the left or right, due to the change in the physical characteristics of the studs. In addition, as long as the person walks along the peripteral set 24 maintaining the border set 22 on the right and the central set 26 on the left, the person knows that he or she is staying on on the right side of the walkway or hallway and is maintaining a straight course thereby permitting two-way traffic within the hallway with people moving in opposite directions along the peripteral set 24 proximate each sidewall 14 and 16.

Figure 6:
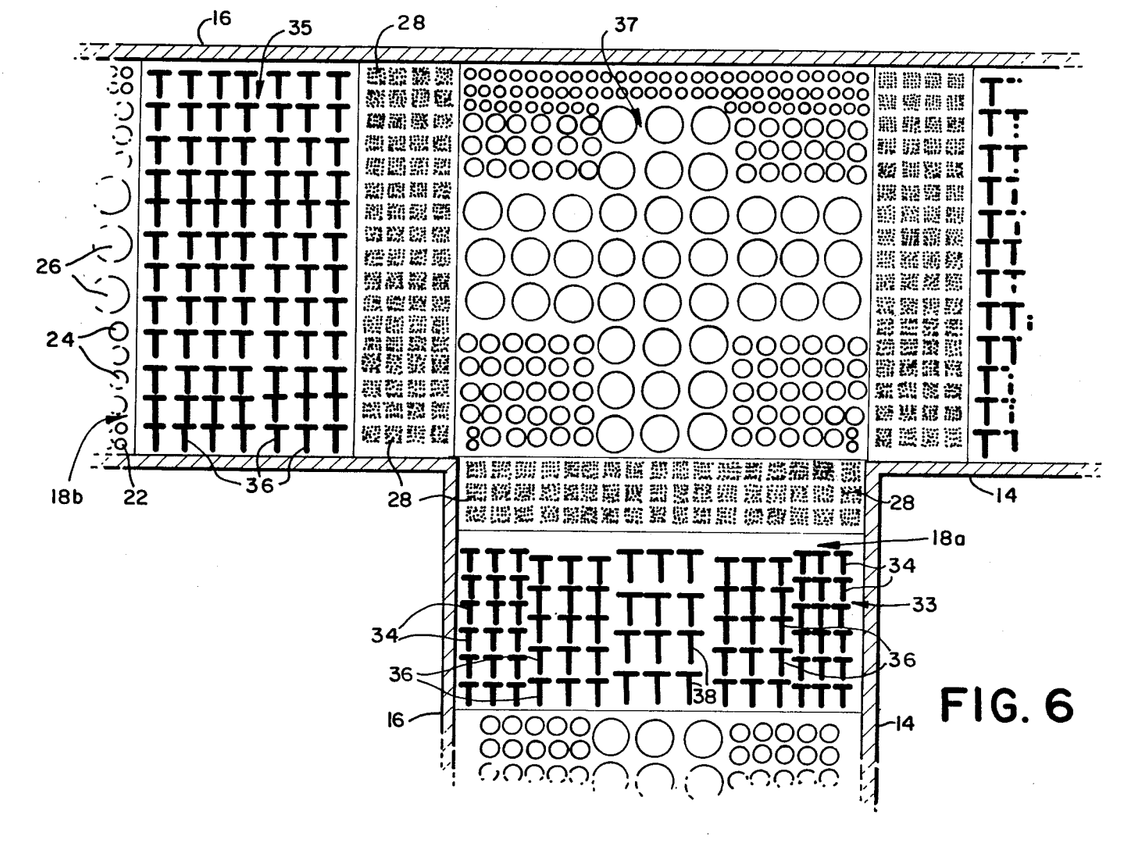
FIG. 6 is a schematic plan view of a slightly different aspect of the guidance system of FIG. 1 showing a three-way intersection.

Referring now to FIG. 6, there is shown a variation of the present invention as it relates to the intersection of two corridors or walking surfaces. In the embodiment shown in FIG. 6, the intersection is a three-way intersection whereby a first corridor or walking surface 18a intersects generally at a right-angle with a second corridor or walking surface 18b, the first walking surface 18a ending at the intersection. This type of intersection is sometimes referred to as a dead end or as a "T"-type intersection, the first walking surface 18a forming the leg of the "T" and the second walking surface 18b forming the crossbar of the "T".

The two walking surfaces 18a and 18b each includes the graded tactual stimuli of the first, second and third sets 22, 24 and 26, respectively, arranged substantially as described above. For brevity and clarity, FIG. 6 shows only some of the tactual stimuli of the first three sets 22, 24 and 26, it being understood that in actuality, these sets of tactual stimuli would be arranged in the manner as described above.

A fifth set of tactual stimuli is generally continuously distributed over a fifth portion of the walking surfaces 18a and 18b extending generally laterally across each walking surface. In FIG. 6, the fifth set of tactual stimuli on walking surface 18a is indicated generally as 33 while the fifth set of tactual stimuli of walking surface 18b is indicated generally as 35. The fifth sets of tactual stimuli, 33 and 35, have physical characteristics which are different from those of any of the first four sets of tactual stimuli 22, 24, 26 and 28, so that a person traversing either of the walking surfaces 18a or 18b can readily distinguish between the fifth sets of tactual stimuli 33 or 35, and the other sets of tactual stimuli.

In the present embodiment, each fifth portion of each of the walking surfaces 18a and 18b comprises an area which extends laterally across the entire walking surface from wall to wall as shown and extends lengthwise for a distance of approximately one and one-half meters. It should be appreciated by those skilled in the art that the length of the fifth portion of the walking surface may be greater or lesser than the one and one-half meters of the present embodiment and that the fifth portion of the walking surface need not extend completely laterally across the walking surface from wall to wall.

The tactual stimuli of the fifth set 33 and 35 are preferably located proximate the entrance to the intersection of the two walking surfaces 18a and 18b which is shown generally as 37. In the presently preferred embodiment, the stimuli of the fifth set 33 and 35 are displaced slightly from the intersection 37 and a fourth or beacon set of tactual stimuli 28 is disposed therebetween. The fourth set of tactual stimuli 28 is substantially the same as described above and is employed to indicate the immediate presence of a landmark or obstacle, in this case the actual entrance to the intersection 37.

The primary purpose of the fifth set of tactual stimuli is to provide information regarding the structure and orientation of the intersection 37. In the present embodiment, the information is provided by the shape and orientation of the tactual stimuli of the fifth sets 33 and 35. The individual stimuli of the fifth sets 33 and 35 are generally T-shaped in horizontal cross section, with the T's oriented in substantially the same manner as the orientation of the intersection 37. Thus, a person whose vision is impaired who is proceeding along walking surface 18a toward the intersection 37 when encountering the fifth set of tactual stimuli 33 will know from the shape and orientation of the stimuli of the fifth set 33 that a three-way intersection is slightly ahead and that the walking surface 18a currently being walked upon will dead end at the intersection 37. As the person proceeds further along walking surface 18a, he or she will encounter the fourth set of tactual stimuli 28 indicating that the intersection 37 is immediately ahead. Likewise, a visually impaired person traveling along walking surface 18b from left to right (when viewing FIG. 6) who encounters the fifth set of tactual stimuli 35 will also know from the shape and orientation of the stimuli that a three-way intersection is slightly ahead and that he or she may either continue straight ahead or, if desired, may turn toward the right. Again, as the person proceeds further along walking surface 18b, he or she will encounter the fourth set of tactual stimuli 28 which indicates the immediate presence of the entrance to the intersection 37.

While in the presently preferred embodiment as shown in FIG. 6, the tactual stimuli of the fifth set comprise individual stimuli which are T-shaped in horizontal cross section, it should be appreciated by those skilled in the art that the stimuli of the fifth set may comprise any other particular shape which conveys the information to a person traversing the walking surface 18a or 18b. For example, the stimuli of the fifth set could be semicircular in horizontal cross section (not shown) with the flat portion of the semicircle positioned in the same manner as the crossbar of the T-shaped stimuli shown in FIG. 6. Correspondingly, the stimuli of the fifth set may have a specialized height, slope, spacing or the like, or any combination thereof, which would be employed to indicate the presence of such an intersection.

As FIG. 6 also indicates, the tactual stimuli of the fifth sets 33 and 35, may vary in size. For example, the fifth set of tactual stimuli 33 of walking surface 18a actually comprises three subsets. The first subset is a border subset 34 located proximate to each of the sidewalls 14 and 16. The second subset is a peripteral subset 36 located generally inwardly from the border subset 34. The third subset is a central subset 38 located in the central portion of the walking surface 18a between the peripteral subset 36. The three subsets 34, 36 and 38 of T-shaped tactual stimuli preferably are arranged in the same ratios and manner as that of the first, second and third sets 22, 24 and 26 of tactual stimuli discussed above thus forming the tactual stimulation gradient. Alternatively, all of the tactual stimuli of the fifth set 35 of walking surface 18b have substantially the same physical characteristics, i.e., they are all the same size, height, spacing, etc. It will be appreciated by those skilled in the art that other such variations could be employed with respect to the physical characteristics of the tactual stimuli of the fifth set.

Figure 7:
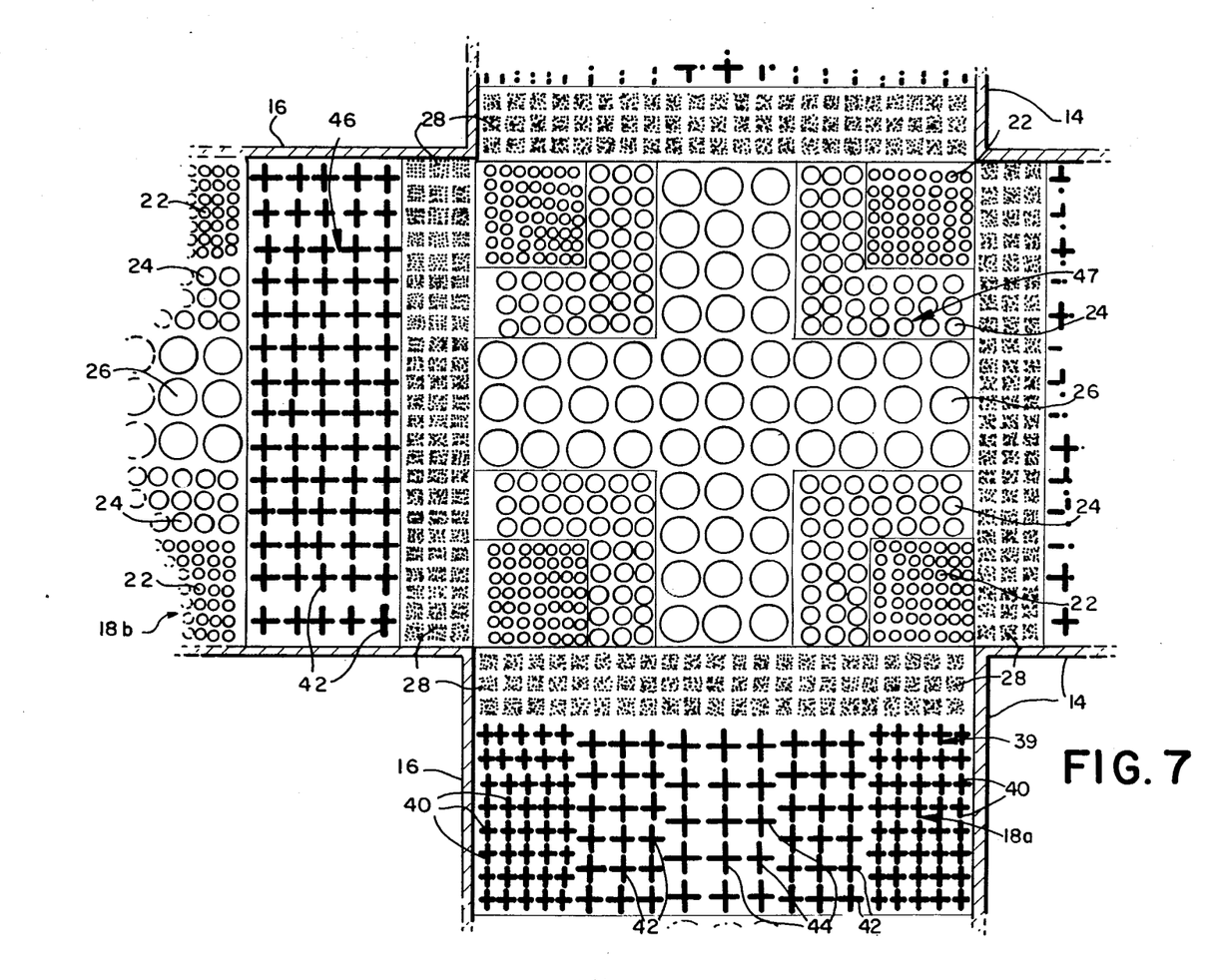
FIG. 7 is a schematic plan view of yet another aspect of the guidance system of FIG. 1 showing a four-way intersection.

Referring now to FIG. 7, there is shown a slightly different variation of the present invention as it relates to a different type of intersection of two corridors or walking surfaces 18a and 18b. In the present embodiment, the intersection is a four-way intersection whereby a first corridor or walking surface 18a intersects with a second corridor or walking surface 18b, both of the walking surfaces 18a and 18b continuing past the intersection. This type of intersection is sometimes referred to as an X- or cross-type intersection. While in the present embodiment the two walking surfaces 18a and 18b are indicated as being substantially perpendicular, it will be appreciated by those skilled in the art that the two walking surfaces 18a and 18b could intersect at a different angle (not shown) other than the right angle as shown.

As with the above-described embodiments, the two walking surfaces 18a and 18b each includes the gradient of tactual stimuli of the first, second and third sets, 22, 24 and 26, respectively, arranged substantially as described above. Again, for the sake of brevity and clarity, FIG. 7 shows only some of the tactual stimuli of these first three sets, it being understood that in actuality the sets of tactual stimuli would be arranged substantially as described above.

In FIG. 7, a fifth set of tactual stimuli 39 is generally continuously distributed over a fifth portion of walking surface 18a. Likewise, a fifth set of tactual stimuli shown generally as 46 is generally continuously distributed over a fifth portion of walking surface 18b. The fifth sets of tactual stimuli 39 and 46 have physical characteristics which are different from any of those of the first four sets of tactual stimuli 22, 24, 26 and 28, so that a person traveling on either of the walking surfaces 18a or 18b can readily distinguish between the fifth sets of tactual stimuli 39 and 46 and the other sets of tactual stimuli.

As with the embodiment of FIG. 6, each fifth portion of each of the walking surfaces 18a and 18b comprises an area which extends generally laterally across the entire walking surface from wall to wall and extends lengthwise for a distance of approximately one and one-half meters. The tactual stimuli of the fifth sets 39 and 46 are located proximate to the entrances to the intersection. As with the embodiment of FIG. 6, a fourth or beacon set of tactual stimuli 28 is disposed between the fifth sets 39 and 46 and the actual intersection entrance.

Like the T-shaped tactual stimuli of the fifth sets of 33 and 35 of the embodiment shown in FIG. 6, the fifth sets of tactual stimuli 39 and 46 of the present embodiment are shaped and oriented to provide information regarding the structure and orientation of the intersection 47. In the present embodiment, the information is provided by the shape of the individual tactual stimuli of the fifth sets 39 and 46, each of which is generally plus-shaped in horizontal cross section with the axes of the plus being oriented to be parallel to the walking surfaces 18a and 18b, respectively. Thus, a person whose vision is impaired, who is proceeding along either walking surface 18a and 18b towards the intersection 47, when encountering the fifth set of tactual stimuli 39 or 46, will know that a four-way intersection is slightly ahead. As with the embodiment of FIG. 6, a strip of beacon or fourth set stimuli is disposed between the fifth sets of stimuli 39 and 46 and the entrances to the intersection 47.

As with the embodiment shown in FIG. 6, characteristics other than the shape of the stimuli of the fifth set may be altered to indicate the presence of the intersection 47. Likewise, the individual plus-shaped stimuli may be generally all of the same size as shown by the fifth set 46 or may comprise three individual subsets 40, 42 and 44 as shown with regard to fifth set 39. Subsets 40, 42 and 44 comprise border, peripteral and central subsets having gradient characteristics substantially the same as those described above with respect to the corresponding first, second and third sets of tactual stimuli 22, 24 and 26, respectively.

From the foregoing description, it can be seen that the present invention provides a bipedal guidance system for permitting a person whose vision is impaired to know his or her location within an area having boundaries and a walking surface and the spatial dimensions of the area. The bipedal guidance system of the present invention is relatively inexpensive to install and, with training and practice, is simple to use. It will be appreciated by those skilled in the art that changes could be made to the embodiment described above without departing from the broad inventive concepts of the present invention. It is understood, therefore, that this invention is not limited to the particular embodiment disclosed, but it is intended to cover all modifications which are within the scope and spirit of the invention as defined by the appended claims.

I claim:

1. A bipedal guidance system for permitting a person whose vision is impaired to ascertain his or her location within an area having boundaries and a walking surface comprising:

a first set of tactual stimuli generally continuously distributed along a first portion of the walking surface extending from the boundaries inwardly for a first predetermined distance, all of the tactual stimuli of the first set having substantially the same physical characteristics;

a second set of tactual stimuli generally continuously distributed along a second portion of the walking surface extending inwardly from the first portion of the walking surface for a second predetermined distance, all of the tactual stimuli of the second set having substantially the same physical characteristics;

a third set of tactual stimuli generally continuously distributed along a third portion of the walking surface extending inwardly from the second portion of the walking surface for a third predeterminend distance, all of the tactual stimuli of the third set having substantially the same physical characteristics, the physical characteristics of the stimuli of each of the three sets differing so that the three sets of stimuli are distinguishable from each other by the touch of a person traversing the walking surface, the first, second and third predetermined distances being interrelated to form a tactual gradient so that by determining any of the distances a person whose vision is impaired is able to determine the spatial dimension of the area; and a fourth set of tactual stimuli generally continuously distributed over a fourth portion of the walking surface, the fourth set of tactual stimuli being positioned to indicate a particular obstacle or landmark.

2. The guidance system as recited in claim 1 wherein the physical characteristics of the tactual stimuli comprise height, size, shape, slope and spacing from each other.

3. The guidance system as recited in claim 1 further comprising a fifth set of tactual stimuli generally continuously distributed over a fifth portion of the walking surface extending generally laterally across the walking surface, the fifth set of tactual stimuli having physical characteristics different from those of any of the first, second, third and fourth sets and being positioned proximate the intersection of the walking surface with another walking surface.

4. A method for guiding a person whose vision is impaired along an area having boundaries and a walking surface comprising:

providing a first set of tactual stimuli generally continuously distributed along a first portion of the walking surface, extending from the boundaries inwardly for a first predetermined distance;

providing a second set of tactual stimuli generally continuously distributed along a second portion of the walking surface extending inwardly from the first portion of the walking surface for a second predetermined distance;

providing a third set of tactual stimuli generally continuously distributed along a third portion of the walking surface extending inwardly from the second portion of the walking surface for a third predetermined distance, the physical characteristics of the stimuli of each of the three sets differing in a predetermined manner;

training a person whose vision is impaired to discriminate the tactual gradient formed by the sets of tactual stimuli and to distinguish between the three sets of stimuli by touch as the person traverses the walking surface to permit the person to ascertain his or her location within the area and the spatial dimensions of the area;

providing a fourth set of tactual stimuli generally continuously distributed along a fourth portion of the walking surface, to indicate an obstacle or landmark; and training the person to distinguish between the fourth set of tactual stimuli and the other three sets of the tactual stimulus gradient by touch as the person is traversing the walking surface to permit the person to identify the location of the obstacle or landmark.

5. The method as recited in claim 4 further including the step of varying at least one of the physical characteristics of the fourth set of tactual stimuli for each obstacle or landmark to permit the person to identify, as well as locate, each such obstacle or landmark.

6. The method as recited in claim 4 further including the steps of:

providing a fifth set of tactual stimuli generally continuously distributed over a fifth portion of the walking surface extending generally laterally across the walking surface, the fifth set of tactual stimuli having physical characteristics different from those of the other sets, the fifth set being positioned to indicate the intersection of the walking surface with another walking surface; and training the person to distinguish between the fifth ste of tactual stimuli and the other sets by touch to permit the person to identify the intersection.

7. The method as recited in claim 6 and further including the step of shaping and orienting the stimuli of the fifth set to indicate the orientation of the intersection.

* * * * *